May 30, 1950  R. H. CARTER  2,509,421
PRESSURE MEASURING DEVICE
Filed May 15, 1946  2 Sheets-Sheet 1

INVENTOR.
Richard H. Carter
BY *M. B. Tasher*
ATTORNEY.

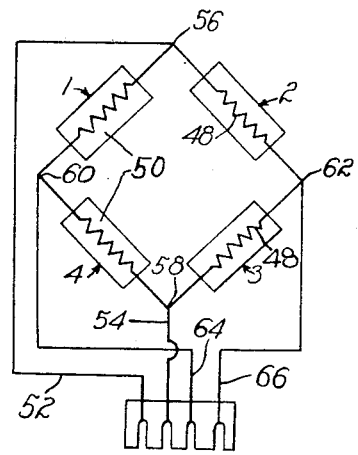
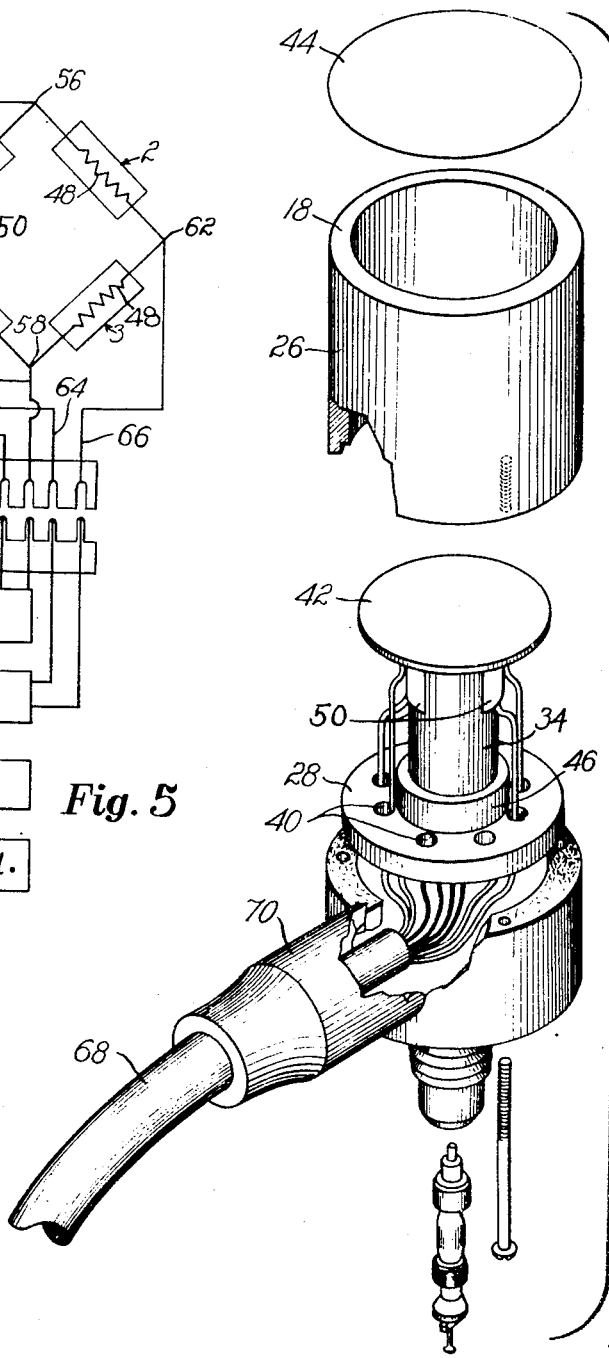
Fig. 5
Fig. 4
INVENTOR.
Richard H. Carter
BY M. B. Tasker
ATTORNEY.

Patented May 30, 1950

2,509,421

UNITED STATES PATENT OFFICE 2,509,421

PRESSURE MEASURING DEVICE

Richard H. Carter, Bridgeport, Conn., assignor to United Aircraft Corporation, East Hartford, Conn., a corporation of Delaware Application May 15, 1946, Serial No. 670,007

7 Claims. (Cl. 73—398)

This invention relates to pressure measuring apparatus, and more particularly to a device to be used in conjunction with conventional oscillographic equipment to measure high frequency pressure changes. The device is particularly advantageous in connection with aircraft, for example, in the measurement of pressures on aircraft surfaces, although it is not limited to this field of use.

It is an object of the invention to provide an improved device for measuring rapidly fluctuating pressures.

A further object of the invention is to provide a pressure measuring device, or pressure pick-up, which is not affected by severe temperature changes encountered in aircraft.

Other objects and advantages of the invention will be apparent from the following detailed description and from the accompanying drawings which illustrate a preferred form of the invention.

In these drawings,

Fig. 4 is an exploded perspective view of the device; and

Fig. 5 is a wiring diagram showing the circuit connections for the electric strain gauges and the oscillographic equipment.

Figure 1:
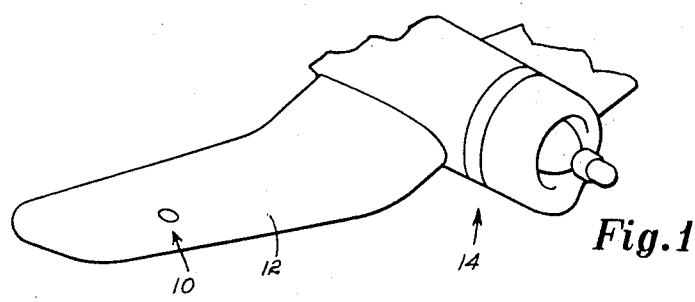
Fig. 1 is a fragmentary view of an airplane showing a pressure pick-up embodying the invention applied to an aircraft for measuring the fluctuating air pressures on a wing during maneuvers.
Figure 2:
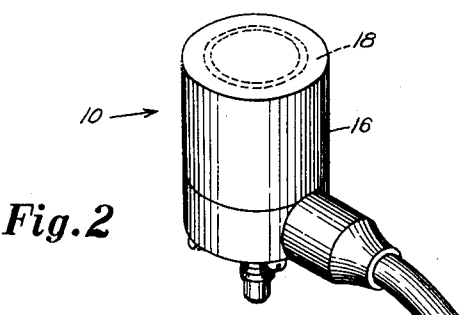
Fig. 2 is a perspective view of the pick-up.
Figure 3:
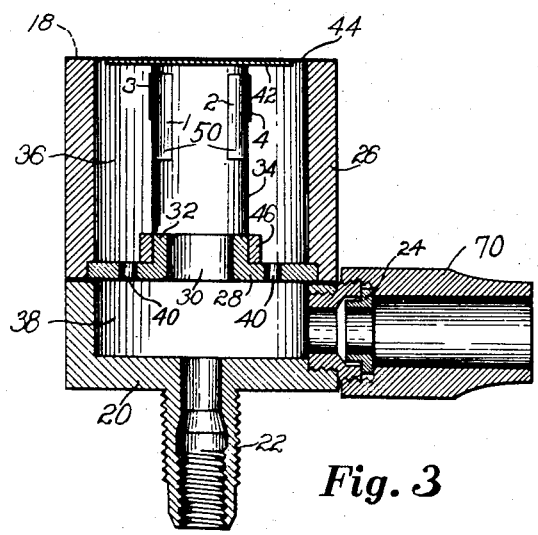
Fig. 3 is a vertical sectional view of the pick-up of Fig. 2.

As herein shown, the pressure pick-up, generally indicated at 10 (Fig. 2), is installed on the upper wing surface 12 of an airplane 14 for the purpose of measuring and, if desired, making a permanent record of the fluctuating air pressure to which the wing surface is subjected during flight. Usually the pressure pick-up is mounted on a removable surface position of the wing, such as a hand-hole cover in which a hole is cut to receive the cylindrical casing 16 of the device with the flat upper surface 18 thereof flush with the wing surface 12.

The casing 16 is shown herein as including a lower cup-shaped part 20 having a pipe connection 22 in its bottom wall for connecting the interior of the casing to the static reference pressure and a cable connection and collar 24 at one side, through which electrical conductors are carried into the casing. The casing further includes an upper tubular portion 26 terminating in the flat upper end surface 18. Between these casing portions 20 and 26 an annular plate 28 is received and the two casing parts 20, 26 and the plate 28 are permanently secured together to form a fluid-tight casing at the final assembly of the device.

The plate 28 has a central passage 30 surrounded by an upstanding annular flange 32 and forms a supporting and centering means for a very thin-walled cylinder 34 which is conterminous with the upper end of casing portion 26. Preferably the cylinder 34 is of resilient metal and has a wall thickness of about .001 of an inch, although its thickness will vary somewhat for different materials and pressure ranges.

Plate 28 and cylinder 34 divide the casing into two chambers 36 and 38 which are constantly in fluid communication through a plurality of holes 40 in plate 28 which permits the pressure in both chambers 36 and 38 to change with changes in static air pressure. It will also be noted that by reason of holes 40 the thin-walled cylinder 34 is acted upon by equal unit pressures on its inner and outer surfaces.

The cylinder 34 is adapted to have the pressures to be measured exerted longitudinally on its upper end by a flexible diaphragm to cause longitudinal contractions and extensions in the cylinder. To this end a relatively thick metal plate member 42 is cemented to the upper end of cylinder 34. Member 42 is of sufficient rigidity to transmit the acting pressures on its upper surface directly to the cylinder 34. The chambers 36 and 38 are closed at their upper ends by a thin sheet of parchment 44 which is secured to the top surface 18 of cylinder 26 and to the plate 42 by a suitable adhesive. It will be noted that the diameter of plate 42 is sufficiently less than the inside diameter of cylinder 26 so that plate 42 due to its support by parchment 44 constitutes a vertically movable plate. The parchment sheet 44 constitutes a flexible seal for the upper end of cylinder 26 and also laterally supports the pressure plate 42 in position to engage the upper end of the pressure responsive cylinder 34. The cylinder 34 is anchored at its lower end by a collar 46 which surrounds the flange 32 and the lower end of cylinder 34.

The longitudinal deformations of cylinder 34 are proportional to the pressure acting on plate 42 and these deformations are measured by means of four electric strain gauges 1, 2, 3, 4, which are mounted on the inner and outer surfaces of cylinder 34 in symmetrical arrangement about its periphery just below the pressure plate 42. Each strain gauge consists of the usual grid 48 of resistance wire which is adhesively secured to a backing sheet 50 which is in turn adhesively secured to the cylinder surface. The strain gauges are arranged so that the grids 48 of the inner gauges 1 and 2 are vertically disposed, i. e. with the length of the grids running vertically, and the grids of the outer gauges are horizontally disposed. Strain gauges having a resistance of from 50 to 500 ohms have been found satisfactory. Strains in the cylinder wall caused by variations in pressure acting on plate 42 cause the resistance of the grids to vary as a function of these strains, and by arranging the strain gauge grids in Wheatstone bridge circuits and measuring the output of the bridge circuit, an accurate indication of the pressures acting on plate 42 is obtained with reference to the controlled static line pressure. The circuit connections for the grids are shown in Fig. 5 wherein it will be noted that the output of the oscillator is transmitted through conductors 52, 54 to points 56, 58 of the bridge, whereas the normally equi-potential points 60, 62 of the bridge are connected by conductors 64, 66 to the amplifier. The oscillographic equipment, which is shown diagrammatically, is conventional.

Conductors 52, 54, 64 and 66 are contained in a cable 68 which has its terminal 70 attached to connection 24 in a fluid-tight manner.

It will be evident that as a result of this invention a pressure measuring apparatus has been provided which is capable of indicating and recording rapid fluctuations of pressure. Further, a device has been provided which is not affected by the severe temperature changes encountered in aircraft flight, since the cylinder 34 is free to expand and contract without affecting the accuracy of the results, and the arrangement of all four strain gauges on the cylinder wall cancels resistance changes due to temperature variations.

While only one embodiment of the invention has been described and shown herein, for purposes of illustration, it will be evident that the invention is not limited to the specific embodiment shown but that many changes may be made in the construction and arrangement of the parts without departing from the scope of the invention as defined by the appended claims.

What it is desired to secure by Letters Patent is:

1. A pressure measuring device including a casing open at the top, a flexible diaphragm secured to and forming a fluid-tight closure for said open top, a transverse member in said casing spaced above the bottom thereof, an unstressed hollow cylindrical member in said casing rigidly supported at its lower end on said transverse member and having its upper end disposed beneath said diaphragm, a rigid plate member on the upper end of said cylindrical member engaging said diaphragm, means for introducing a reference pressure within said casing via a chamber below said transverse member, passages within said transverse member providing fluid communication between the inside and outside of said cylindrical member, and means including strain gauge means carried by said cylindrical member on its inside and outside surfaces for measuring the longitudinal deformations of said cylindrical member.

2. A pressure responsive device as set forth in claim 1 in which four strain gauges are provided which are connected in the four legs of a Wheatstone bridge circuit, two of said gauges being mounted on the inner surface of said cylindrical member and the other two being mounted on the outer surface of said member.

3. A pressure responsive device as set forth in claim 1 in which four strain gauges are connected in the four legs of a Wheatstone bridge circuit, two of said gauges being mounted on the inner surface of said cylindrical member and the other two being mounted on the outer surface of said member, the inner pair having the major axes of their grids arranged at right angles to the major axes of the grids of the outer pair.

4. In a pressure measuring device, a cup-like case, a flexible diaphragm secured to and forming a fluid tight closure for the open top of said case, a transverse plate in said case spaced above the bottom thereof, said plate having an annular central flange defining a passage through said plate and also having perforations located between said flange and the walls of said case, a thin-walled cylindrical member in said case rigidly supported at its lower end on said flange and terminating at its upper end beneath said diaphragm, a rigid plate member secured to the upper end of said cylindrical member and abutting said diaphragm, said perforations and said passage providing fluid communication between the inside and outside of said cylindrical member, and identical strain gages having their grids arranged on the inner and outer surfaces of said cylindrical member, said grids being vertically disposed on the outer surface to measure longitudinal deformation of said cylindrical member and horizontally disposed on the inner surface to compensate for temperature variations.

5. A pressure measuring device according to claim 4 in which four strain gages are provided which are connected to form four legs of a Wheatstone bridge circuit.

6. In a highly sensitive pressure measuring device, a casing open at the top, a flexible diaphragm secured to and forming a fluid tight closure for said open top, a transverse member in said casing spaced above the bottom thereof, a thin-walled cylindrical element in said casing rigidly supported at its lower end on said member and terminating at its upper end beneath said diaphragm, a rigid plate on the upper end of said cylindrical element abutting said diaphragm, means providing temperature and pressure equalization on said element including passage means for establishing fluid communication between the inside and outside of said element, two pairs of strain gages on the inner and outer walls of said element, said pairs being disposed at right angles to each other for measuring the deformation of said element, said gages being interconnected as legs of a Wheatstone bridge circuit, and indicator means energized by unbalance of said bridge circuit.

7. In a device for measuring pressures on airplane surfaces in flight, a casing open at the top, a fluid tight diaphragm forming a closure for said open top and flush with the airplane surface on which the pressure is being measured, a transverse member within said case and spaced above the bottom thereof, an unstressed thin-walled cylindrical element rigidly mounted at one end on said member and terminating at its other end beneath said diaphragm, a rigid plate member interposed between said diaphragm and the upper end of said cylindrical element, said member providing a means for fluid communication between the inside and outside of said cylindrical element, a connection in the bottom of said casing for admitting a reference pressure through said communication means, and a means for measuring the longitudinal deformation of said element due to pressure applied to the airplane surface including pairs of strain gages mounted on the inner and outer surfaces of said element, said pairs being angularly displaced relative to each other.

RICHARD H. CARTER.

REFERENCES CITED

The following references are of record in the file of this patent:

UNITED STATES PATENTS

| Number | Name | Date |
|---|---|---|
| 2,398,372 | Green | Apr. 16, 1946 |
| 2,398,401 | Bancroft et al. | Apr. 16, 1946 |
| 2,405,199 | Faust et al. | Aug. 6, 1946 |
| 2,420,148 | Ostergren | May 6, 1947 |
| 2,472,045 | Gibbons | May 31, 1949 |
| 2,488,347 | Thurston | Nov. 15, 1949 |